United States Patent [19]

Yaguchi

[11] Patent Number: 4,679,093
[45] Date of Patent: Jul. 7, 1987

[54] IMAGE COMMUNICATION APPARATUS

[75] Inventor: Tatsuya Yaguchi, Yokohama, Japan

[73] Assignee: Canon Kabushiki Kaisha, Tokyo, Japan

[21] Appl. No.: 676,252

[22] Filed: Nov. 29, 1984

[30] Foreign Application Priority Data

Dec. 5, 1983 [JP] Japan ................. 58-228350
Dec. 5, 1983 [JP] Japan ................. 58-228351

[51] Int. Cl.⁴ .............................................. H04N 1/32
[52] U.S. Cl. .................................. 358/257; 358/287;
358/293; 358/304
[58] Field of Search ............... 358/257, 287, 293, 286,
358/304; 355/13

[56] References Cited

U.S. PATENT DOCUMENTS 4,224,641  4/1980  Kanda ................................. 358/257
4,506,302  3/1985  Kurata ................................. 358/287

Primary Examiner—Edward L. Coles, Sr.
Attorney, Agent, or Firm—Fitzpatrick, Cella, Harper & Scinto

[57] ABSTRACT

An image communication apparatus has a detector for detecting if the length of a text sheet to be transmitted is greater than the length of a cut record sheet in a receiving unit, and inform means for informing the transmission of the text sheet in a division mode in accordance with a detection signal from the detection means.

16 Claims, 8 Drawing Figures

IMAGE COMMUNICATION APPARATUS

BACKGROUND OF THE INVENTION

1. Field of the Invention

The present invention relates to an image communication apparatus which reads an original image and transmits the read image data, or receives a transmitted image data and visualizes the received image data.

2. Description of the Prior Art

When a image data is transmitted by an image communication apparatus such as a facsimile machine, a boundary of an original sheet of a fixed size can be determined in a receiving station and a sending station.

More particularly, when a rolled record paper is used in the receiving station and the receiving station receives the text written on the sheets of the fixed size, the boundaries of the text sheets can be determined by spaces between the text sheets.

When the original sheet to be transmitted is written on a continuous form and the receiving station has only cut sheets of a fixed size, an operator at the sending station cannot determine whether the original was transmitted in a division mode or detect a portion separated by the cut record sheets. In the receiving station, whether the original is transmitted on a continuous form or not cannot be determined because the continuous form text received is divided. Accordingly, management of the received text is difficult.

SUMMARY OF THE INVENTION

It is an object of the present invention to provide an image communication apparatus which can recognize in a sending station whether a continuous form original has been transmitted in a division mode, and which can recognize boundaries between the divided parts of the original.

It is another object of the present invention to provide an image communication apparatus which can recognize in a receiving station whether a received text was transmitted from a continuous form original.

According to the present invention, the foregoing objects are attained by means of an image communication apparatus comprising means for detecting the length of an original sheet, means for discriminating that the original sheet length is greater than that of a cut record sheet in a receiving unit, means for transmitting the original image in a division manner responsive to an output of the discriminating means, and optically, means for informing that the original image is transmitted in the division manner. Preferably, the transmission means is arranged so as not to perform transmission operation in the division manner when the discriminating means determines that the excess of the original document length over the length of the cut recording sheet is less than a predetermined value.

In another aspect, the present invention is directed to an image communication apparatus comprising means for storing received image data, means for recording on a cut sheet an image corresponding to the image data, means for discriminating that the length of the image is greater than that of the cut sheet, and means for controlling operation of the apparatus such that the image data is divided for recording on different cut sheets responsive to an output of the discrimination means. Optionally, inform means for informing that the image data is recorded in such a division manner may be provided, and preferably, the control means is arranged such that such divisional recording is not performed by the record means when the discrimination means discriminates that the excess of the image length over the cut sheet length is less than a predetermined value.

Other objects and features of the present invention will be apparent from the following description of the invention taken in conjunction with the accompanying drawings.

DETAILED DESCRIPTION OF THE PREFERRED EMBODIMENTS

Figure 1:
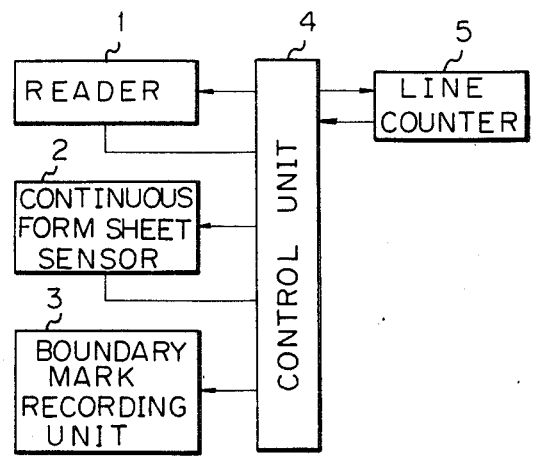
FIG. 1 is a block diagram of a control circuit of an image transmission unit.

FIG. 1 shows a block diagram of a control circuit of a facsimile transmission unit in accordance with one embodiment of the present invention.

Numeral 1 denotes an original reader. In a facsimile machine, the original is read line by line. Numeral 2 denotes a continuous form original sensor which discriminates a cut sheet original from the continuous form original. Numeral 3 denotes a boundary mark recorder, or recording unit, which records a boundary mark on a boundary of the continuous form original when it is transmitted, and numeral 5 denotes a line counter which accumulates the number of scan lines, starting from the start of reading of the original.

Those blocks are controlled by a control unit 4 in a manner to be described below.

Figure 2:
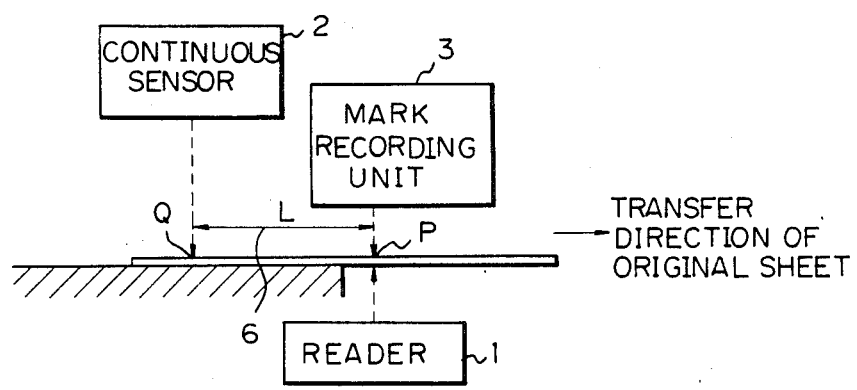
FIG. 2 illustrates a positional relationship of sensors.

FIG. 2 shows a positional relationship of the continuous form original sensor 2, the reader 1 and the boundary mark recorder 3. Numeral 6 denotes a distance L between a projection point P, on the original sheet, of the reader 1 and the boundary mark recorder 3, and a projection point Q, on the original sheet, of the continuous form original sensor 2.

The operation of the present embodiment thus constructed is now explained.

Figure 3:
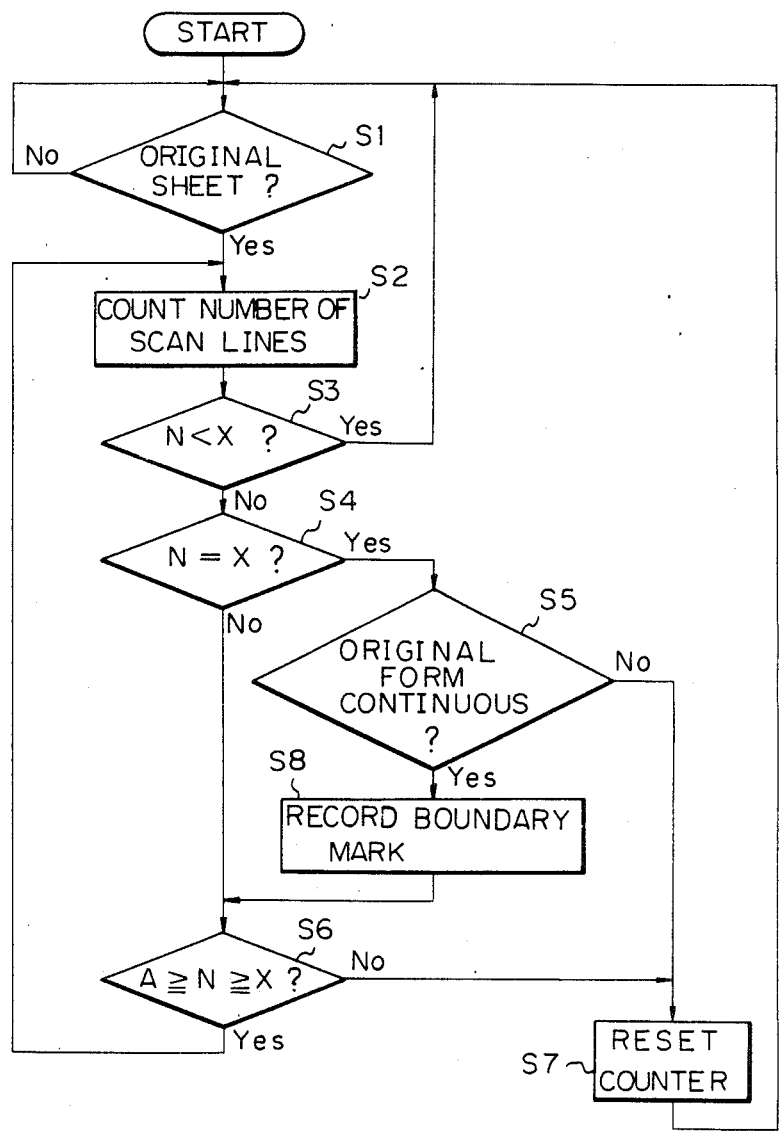
FIG. 3 is a flow chart showing a control method.

FIG. 3 is a flow chart illustrating a method of control by the control unit 4. In a step S1, the presence or absence of the original is checked, and if it is present, the process proceeds to a step S2, where reading of one line is started and counting of the read scan line is started.

In a step S3, it is determined, whether the accumulated number N of lines is larger than a predetermined number X, and if it is larger, the process proceeds to a step S4, and if it is smaller, the process goes back to the step S1.

The number X is determined in the following manner. Assume that a line density of the apparatus is 7.7 lines/mm and the boundary mark is to be recorded 1 cm from a bottom of a size A4 original sheet. The total number of scan lines in a longitudinal direction of the size A4 original sheet is equal to $297 \times 7.7 = 2287$ lines (value A). Thus, X is set to $2287 - 7.7 \times 10 = 2210$.

In the step S4, if the accumulated number N is not equal to X, the process proceeds to a step S5, and if it is equal, the process proceeds to a step S6.

In the step S5, the continuous form original sensor 2 checks if the original sheet is present at the detection position Q, that is, if the original to be transmitted is the continuous form original or not. If it is not a continuous form original, the process proceeds to a step S7 where the counter 5 is reset, and the process goes back to the step S1 in preparation for the next original.

If it is the continuous form original, the boundary mark is recorded by the boundary mark recorder 3 in a step S8, and then the process proceeds to a step S6.

The boundary mark may be of any form and it may be, for example, a character "C".

If the original is the continuous form original, the counter continues to count so long as the accumulated number N is $A \geq N \geq X$. When $N > A$, that is, when the reading for the size A4 is completed, the process proceeds to a step S7 where the count N of the counter is reset to "0". Accordingly, if the continuous form original is longer than three-A4 size length, the boundary marks are recorded at two or more points.

In this manner, when the continuous form original is transmitted, the boundary marks are recorded on the continuous form original in the transmitting station in accordance with the predetermined cut record sheet size so that the transmission of the continuous form original in the divided form can be recognized in the transmission station.

The distance L between the read position P of the reader 1 and the detection position Q of the continuous form sensor 2 is selected to be no shorter than $(A-X)/(\text{scan density})$. In the present embodiment, it is no shorter than $(2287-2210)/7.7 = 10$ mm. Since the distance $L-(A-X)$ is very short, that area is not transmitted in division but is omitted. The values A and X are changed depending on the size of the record sheet in the receiving station and a magnification if a variable magnification transmission mode is used.

Figure 4:
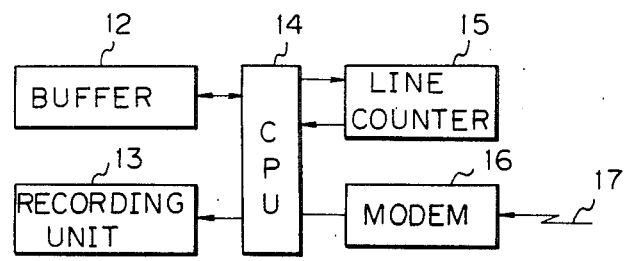
FIG. 4 is a block diagram of an image receiving unit.
Figure 5:
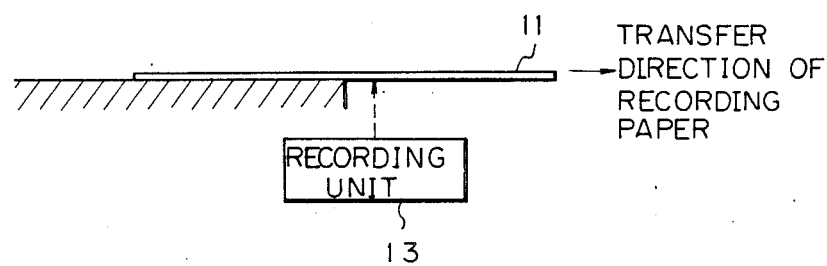
FIG. 5 shows a positional relationship.

The receiving unit is now explained FIG. 4 is a block diagram of a control circuit of a facsimile receiving unit. Numeral 12 denotes a buffer memory in which an image signal to be recorded is stored, numeral 13 denotes a recorder for recording the image signal and the boundary mark, numeral 14 denotes a control unit, numeral 15 denotes a line counter for counting the number of record lines of the recorder, and numeral 16 denotes a modem for modulating and demodulating transmission signal from a telephone line 17. FIG. 5 shows a feed direction of a record sheet 11 and a record position of the recorder 13. The record sheet 11 is a cut sheet, for example, a size A4 cut sheet.

Figure 6:
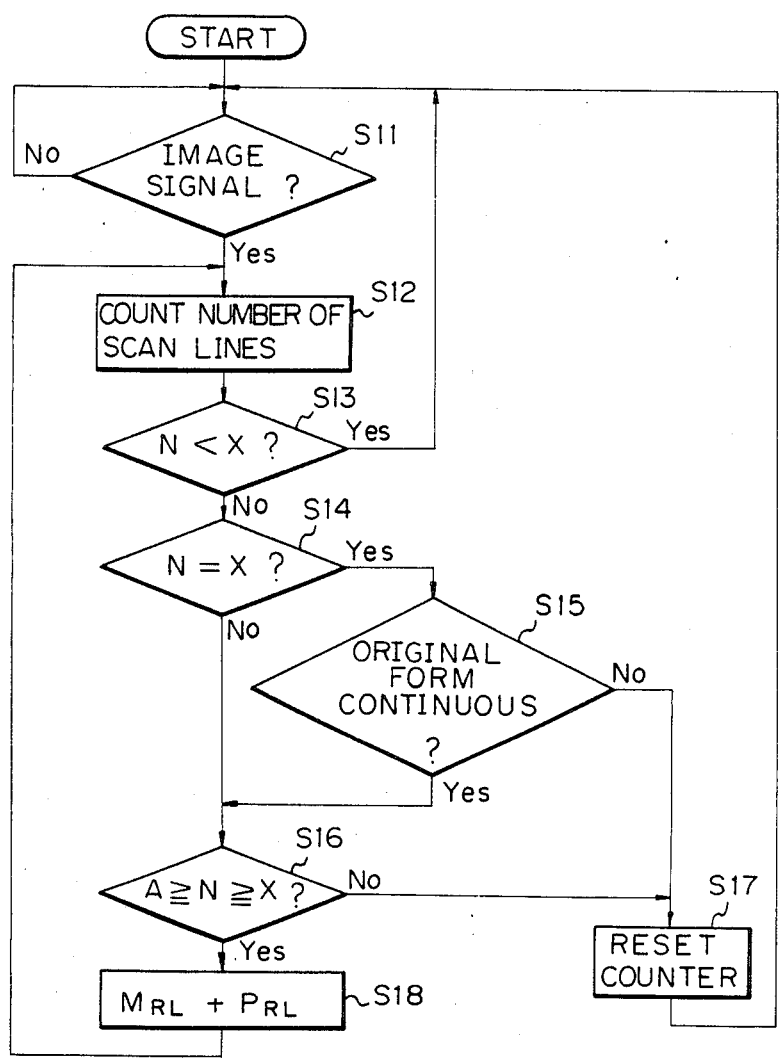
FIGS. 6 and 7 are flow charts showing a control method.

FIG. 6 is a flow chart showing a control method of the control unit 14. In a step S11, the presence or absence of the image signal in the buffer 12 is checked. If the signal is present, the process proceeds to a step S12 where one scan line of data is recorded by the recorder 13 and the counting of the recorded scan lines by the line counter 15 is started.

In a step S13, it is determined whether the accumulated number N of lines is the line counter 15 is larger than X or not, and if it is larger, the process proceeds to a step S14, and if it is smaller, the process goes back to the step S11.

The value X is determined in the following manner. Assume that a line density of the apparatus is 7.7 lines 1 mm and the boundary mark is recorded at 1 cm from the bottom of the size A4 original sheet. The total number of scan lines in the longitudinal direction of the original sheet is equal to $297 \times 7.7 = 2287$ lines (value A). Thus, X is set to $2287 - 7.7 \times 10 = 2210$.

Figure 7:
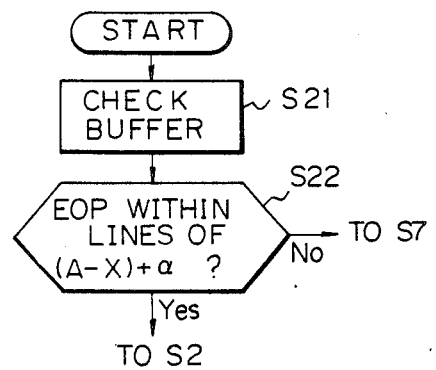
Figure 8:
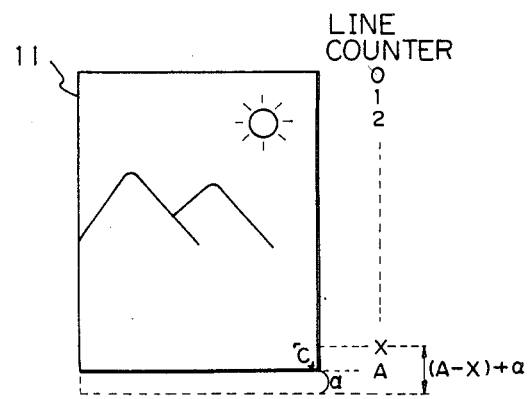
FIG. 8 shows a relationship between cut record sheets and a count of a line counter.

In the step S14, the line counter counts the number of scan lines until the accumulated number N reaches the value X, when the process proceeds to a step S15. In the step S15, whether the original in the transmitting station is continuous form orignal or not is checked. A specific process of the step S15 is shown in FIG. 7. In a step S21, the buffer memory 12 is checked. The recording of the scan lines $1-X$ has been completed. Referring to FIG. 8, the record paper 11 can record up to line A. If an end of page (EOP) signal is included in $(A-X)$ lines of the buffer memory 12, it is not the division transmission mode which is in use. If the EOP is included in $(A-X)+\alpha$ lines and $\alpha$ is a small predetermined value, the area corresponding to $\alpha$ can be omitted. That is, if the original to sheet length is slightly longer than the size A4 length, the longer area is omitted instead of transmitting in the division mode. This decision is made in a step S22. The EOP can be detected by checking if two or more end of line (EOL) signals are continuously detected. If the original is not a continuous form original, the process proceeds to a step S17 where the counter is reset, and then the process goes back to the step S11.

If it is a continuous form original, the process proceeds from the step S16 to a step S18 where the boundary mark is recorded by the recorder 3. The boundary mark may be of any form, and it may be a character "C", for example.

In a step S16, it is determined whether or not the accumulated number N is $A \geq N \geq X$. The routine of the steps S12, S13, S14, S16 and S18 is repeated until N reaches A.

In a step S18, the boundary mark $M_{RL}$ of a run length level is added to the received information area $P_{RL}$ of the run length level and the boundary mark "C" is recorded to indicate the boundary to the image information following to $N=X$.

When N exceeds A, which indicates the end of the size A4 page, the process proceeds from the step S16 to the step S17 where the line counter 15 is reset to "0". If the original sheet length is no shorter than three-A4 size length, the boundary mark is again recorded. The values A and X vary depending on the size of the record sheet.

As described hereinabove, in accordance with the image communication apparatus of the present invention, when the receiving unit uses the cut record sheets and the transmitting unit uses a longer sheet original, the boundary marks are recorded in the transmission station and/or the receiving station so that the divisional transmission mode and the divisional reception mode are recognized.

The present invention is not restricted to the illustrated embodiments, and many modifications may be made within the scope of the appended claims.

What is claimed:
1. An image communication apparatus comprising:
   read means for reading an original image, line by line;
   detection means for detecting a length of an original sheet;
   discrimination means for discriminating that the length of the original sheet is longer than a length of a cut record sheet in a receiving unit, in response to an output of said detection means;
   transmission means for transmitting the original image in a division means, in response to an output of said discrimination means; and inform means for informing that the original image is transmitted in the division manner in response to the output of said discrimination means.

2. An image communication apparatus according to claim 1 wherein said inform means records a boundary mark on the original sheet when the original image is transmitted in the division manner.

3. An image communication apparatus according to claim 2 wherein said boundary mark is recorded near a location to be divided.

4. An image communication apparatus according to claim 1 wherein said detection means accumulates the number of times of the original sheet is read by read means.

5. An image communication apparatus according to claim 4 wherein said detection means detects the length of the original sheet by the accumulated number of times of reading and an original sheet sensor.

6. An image communication apparatus comprising:
   storage means for storing therein received image data;
   record means for recording on a cut sheet an image corresponding to the image data of said storage means;
   discrimination means for discriminating that a length of the image is longer than a length of the cut sheet, responsive to the image data of said storage means;
   control means for controlling operation of said apparatus such that the image data in said storage means is divided to be respectively recorded on different cut sheets, responsive to an output of said discrimination means; and
   inform means for informing that the image data is recorded in such a division manner, responsive to the output of said discriminating means.

7. An image communication apparatus according to claim 6, wherein said inform means operates said record means to record a mark on the cut sheet.

8. An image communication apparatus comprising:
   read means for reading an image of an original document, line by line;
   detection means for detecting a length of the original document;
   discriminating means for discriminating that the length of the original document is longer than a length of a cut recording sheet of a reception unit, responsive to an output of said detection means; and
   transmission means for transmitting the image of the original document in a division manner, responsive to an output of said discrimination means,
   wherein said transmission means does not perform the transmission operation in the division manner when said discrimination means discriminates that an excess of the length of the original document over the length of the cut recording sheet is less than a predetermined value.

9. An apparatus according to claim 8, further comprising information means for informing that the image of the original document is transmitted in the division manner, responsive to the output of said discrimination means.

10. An apparatus according to claim 9, wherein said information means records a boundary mark on the cut recording sheet when the image of the original document is transmitted in the division manner.

11. An apparatus according to claim 10, wherein the boundary mark is recorded near a division.

12. An apparatus according to claim 8, wherein said detection means accumulates a number of times the original document is read by said read means.

13. An apparatus according to claim 12, wherein said detection means detects the length of the original document by the accumulated number of times of reading and by an original document sensor.

14. An image communication apparatus comprising:
   storage means for storing therein received image data;
   record means for recording on a cut recording sheet an image corresponding to the image data of said storage means;
   discrimination means for discriminating that a length of the image is longer than a length of the cut recording sheet, responsive to the image data of said storage means; and
   control means for controlling operation of said apparatus such that the image data is divided to be recorded respectively on different cut sheets, responsive to an output of said discrimination means,
   wherein said control means controls the operation such that said record means does not perform the divisional recording when said discrimination means discriminates that an excess of the length of the image corresponding to the image data over the length of the cut sheet is less than a predetermined value.

15. An apparatus according to claim 14, further comprising infomation means for informing the divisional recording responsive to the output of said discrimination means.

16. An apparatus according to claim 14, wherein said information means operates said recording means to record a mark on the cut sheet.

* * * * *